(12) United States Patent
Mukherjee et al.

(10) Patent No.: US 12,501,290 B2
(45) Date of Patent: Dec. 16, 2025

(54) NR SA HANDOVER SIMULATION

(71) Applicant: Rakuten Symphony, Inc., Tokyo (JP)

(72) Inventors: Argha Mukherjee, Bangalore (IN); Roshan Kumar, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/013,181

(22) PCT Filed: Dec. 16, 2022

(86) PCT No.: PCT/US2022/081776
§ 371 (c)(1),
(2) Date: Dec. 27, 2022

(87) PCT Pub. No.: WO2024/096917
PCT Pub. Date: May 10, 2024

(65) Prior Publication Data
US 2024/0244459 A1 Jul. 18, 2024

(51) Int. Cl.
*H04W 24/06* (2009.01)
*H04W 36/08* (2009.01)

(52) U.S. Cl.
CPC ......... *H04W 24/06* (2013.01); *H04W 36/087* (2023.05)

(58) Field of Classification Search
CPC .............. H04W 24/06; H04W 36/087; H04W 36/0009; H04W 16/22; H04L 43/50
USPC .......................................................... 455/423
See application file for complete search history.

(56) References Cited

U.S. PATENT DOCUMENTS

| 2019/0025367 | A1* | 1/2019 | Vis | H04B 17/104 |
|---|---|---|---|---|
| 2019/0319814 | A1* | 10/2019 | Das | H04W 48/18 |
| 2019/0349822 | A1* | 11/2019 | Kim | H04W 36/08 |
| 2024/0056841 | A1* | 2/2024 | Naseef | H04W 24/06 |
| 2024/0179083 | A1* | 5/2024 | Trivedi | H04L 43/50 |
| 2024/0414558 | A1* | 12/2024 | Haustein | H04L 41/145 |

OTHER PUBLICATIONS

International Search Report and Written Opinion for International Patent Application No. PCT/US22/81776 mailed Mar. 31, 2023.

\* cited by examiner

*Primary Examiner* — Hirdepal Singh
(74) *Attorney, Agent, or Firm* — Sughrue Mion, PLLC

(57) ABSTRACT

Embodiments are directed to a NRDU handover simulator (100) for performing new radio (NR) standalone (SA) handover simulation. The NRDU handover simulator (100) includes UE group simulator (184) configured to generate multiple simulated UE groups and a DU simulator (186) configured to generate multiple simulated DUs and a test controller (182) connected to simulated UE groups and a traffic generator (188). The test controller (182) is configured to receive an input for performing handover for testing a DUT (190) and determine a simulated UE group associated with a simulated DU for performing the handover based on the input. The test controller (182) is configured to cause the traffic generator (188) to generate a traffic profile based on the input for performing the handover of the simulated UE group and perform simulated handover of the UE group associated with the simulated DU periodically, for testing the DUT (190).

14 Claims, 6 Drawing Sheets

NR SA HANDOVER SIMULATION

CROSS-REFERENCE TO RELATED APPLICATIONS

The present application claims priority to and is the 35 U.S.C. 371 United State National Phase application based on International Patent Application No. PCT/US22/81776, filed Dec. 16, 2022, and entitled "NR SA HANDOVER SIMULATION," which claims priority to Indian Patent Application number 202241063024 to Argha Mukherjee et al., filed Nov. 4, 2022, and entitled "NR SA HANDOVER SIMULATION," and incorporates their disclosures herein by reference in their entireties.

FIELD OF INVENTION

The present disclosure relates to device testing and simulation and more specifically related to a method and a handover simulator for performing new radio (NR) standalone (SA) handover simulation.

BACKGROUND

With advancement in technology, a number of users connected to a wireless communication network have increased drastically over time. Therefore, it is important to provide reliable and efficient operation of network functional elements to ensure high quality of service (QoS) to the users. In order to ensure the efficiency of the network functional elements network operators typically test the network functional elements using testing devices before deploying in a live wireless communication network.

The testing devices simulate various communication network conditions while testing the network functional elements which may include for example but not limited to, simulating a number of user equipment or UEs capable of simultaneously registering/de-registering with the wireless communication network, simulating inter-/intra-mobile network equipment handover, transmitting bearer traffic, and/or combinations thereof. The testing of the network functional elements may be one of the three categories which includes functional correctness testing (e.g., protocol validation and compliance), inter-system compatibility and integration testing, and stress testing.

In an example consider a UE in mobility which is moving from point A to point B at very high speed or moving across a large distance. The UE may experience a large number of handovers of different types. While testing the network functional elements it may be required to emulate different types of handovers in a single test case execution. Though the current systems support emulating a specific type of handover at a time, there is no existing system which successfully emulates the different types of handovers in the single test case execution. Thus, it is desired to at least provide a mechanism for auto focus that is devoid of the above issues.

OBJECT OF INVENTION

The principal object of the embodiments herein is to provide a method and a NRDU handover simulator for performing new radio (NR) standalone (SA) handover simulation. The proposed NR SA UE handover simulation includes a UE or a set of UEs attached to a cell capable of performing N number of recursive or serialized handovers to target cells for a single test scenario execution. As a result, the set of handover simulation are executed with low central processing unit (CPU) utilization and memory usage footprint.

SUMMARY

Accordingly, embodiments herein disclose a new radio distributed unit (NRDU) handover simulator for performing new radio (NR) standalone (SA) handover simulation. The NRDU handover simulator includes a UE group simulator configured to generate a plurality of simulated UE groups and a DU simulator configured to generate a plurality of simulated DUs, wherein the plurality of simulated DUs is clubbed to provide a single deployment. The NRDU handover simulator also includes a test controller connected to the plurality of simulated UE groups and a traffic generator. The test controller is configured to receive an input for performing at least one handover for testing a device under test (DUT) and determine at least one simulated UE group of the plurality of simulated UE groups associated with at least one simulated DU of the plurality of simulated DUs for performing the at least one handover based on the input. Further, the test controller is configured to cause the traffic generator to generate a traffic profile based on the input for performing the at least one handover of the at least one simulated UE group and perform simulated handover of the at least one UE group associated with the at least one simulated DU periodically, for testing the DUT.

In an embodiment, the test controller is configured to determine the at least one simulated UE group of the plurality of simulated UE groups associated with the at least one simulated DU of the plurality of simulated DUs for performing the at least one handover based on the input includes generate a handover scenario file comprising a handover management table based on the input, wherein the handover management table comprises handover parameters for each simulated UE group with corresponding cell index. The test controller is also configured to determine the handover parameters for the at least one handover from the handover management table; and determine the at least one simulated UE group of the plurality of simulated UE groups with a corresponding cell index for performing the at least one handover based on the input.

In an embodiment, the plurality of handover scenarios comprises intra DU handover scenario, inter DU handover scenario, inter gNB handover scenario, intra gNB handover scenario, inter frequency handover scenario and intra frequency handover scenario, within the single test scenario.

In an embodiment, the input received by the test controller comprises at least one of: a number of UEs to be simulated within each simulated UE group, a designation of travel path for each simulated UE group, a speed of travel for each simulated UE group on each path, a traffic profile each simulated UE group, a number of DUs to be simulated, number of cells, number of sectors within each of the cells, routes for connecting each of the cells and channel conditions to be simulated for the handover scenarios.

Accordingly, embodiments herein disclose a method for performing new radio (NR) standalone (SA) handover simulation using a NRDU handover simulator. The method includes receiving, by the NRDU handover simulator, an input for performing at least one handover for testing a device under test (DUT) and determining, by the NRDU handover simulator, at least one simulated UE group of a plurality of simulated UE groups associated with at least one simulated DU of a plurality of simulated DUs for performing the at least one handover based on the input. The method also includes generating, by the NRDU handover simulator, a traffic profile based on the input for performing the at least one handover of the at least one simulated UE group and performing, by the NRDU handover simulator, simulated handover of the at least one UE group associated with the at least one simulated DU periodically, for testing the DUT.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
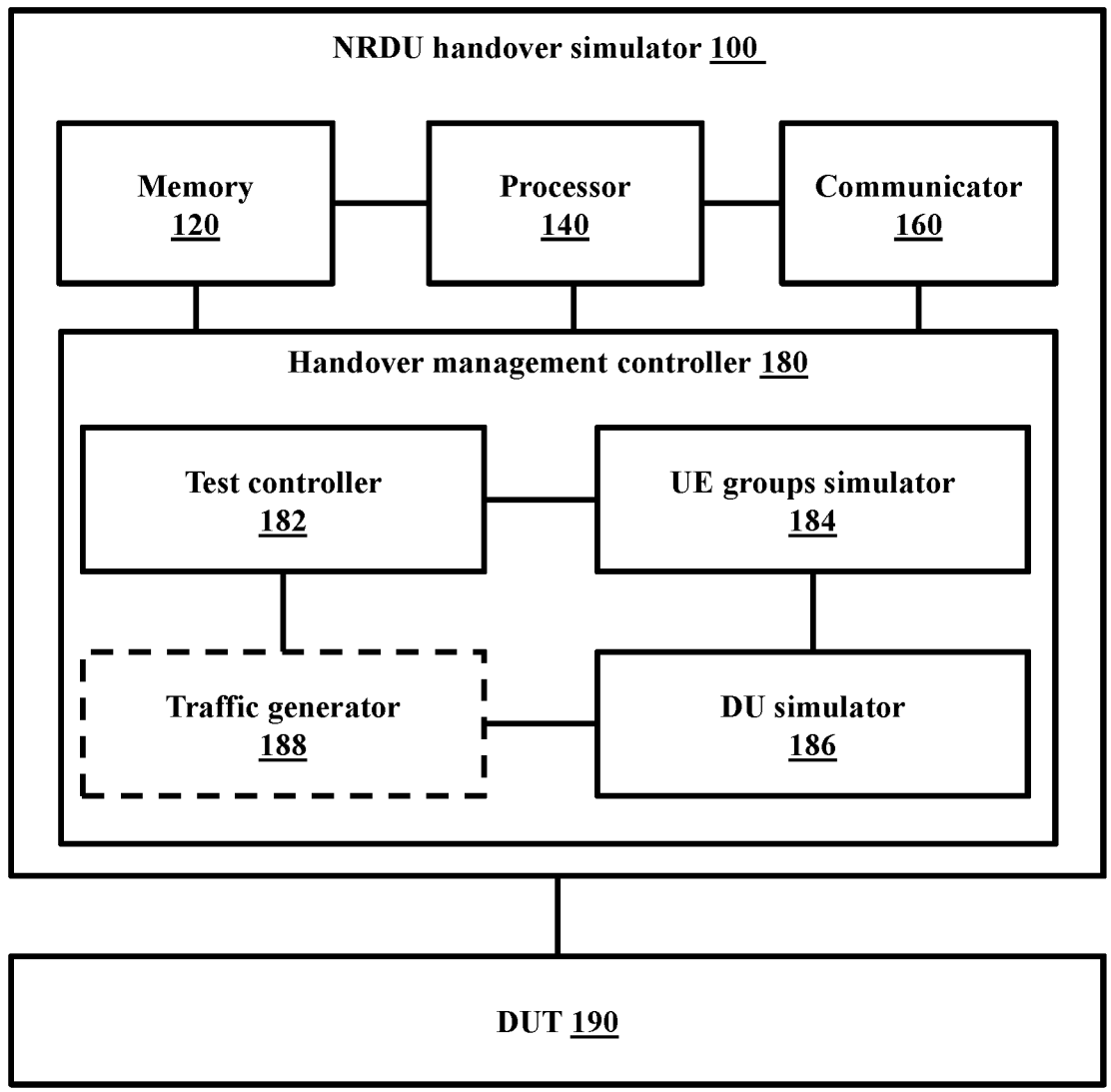
FIG. 1 illustrates a block diagram of a NRDU handover simulator for performing new radio (NR) standalone (SA) handover simulation, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a new radio distributed unit (NRDU) handover simulator for performing new radio (NR) standalone (SA) handover simulation. The NRDU handover simulator includes a UE group simulator configured to generate a plurality of simulated UE groups and a DU simulator configured to generate a plurality of simulated DUs, wherein the plurality of simulated DUs is clubbed to provide a single deployment. The NRDU handover simulator also includes a test controller connected to the plurality of simulated UE groups and a traffic generator. The test controller is configured to receive an input for performing at least one handover for testing a device under test (DUT) and determine at least one simulated UE group of the plurality of simulated UE groups associated with at least one simulated DU of the plurality of simulated DUs for performing the at least one handover based on the input. Further, the test controller is configured to cause the traffic generator to generate a traffic profile based on the input for performing the at least one handover of the at least one simulated UE group and perform simulated handover of the at least one UE group associated with the at least one simulated DU periodically, for testing the DUT.

Accordingly, embodiments herein disclose a method for performing new radio (NR) standalone (SA) handover simulation using a NRDU handover simulator. The method includes receiving, by the NRDU handover simulator, an input for performing at least one handover for testing a device under test (DUT) and determining, by the NRDU handover simulator, at least one simulated UE group of a plurality of simulated UE groups associated with at least one simulated DU of a plurality of simulated DUs for performing the at least one handover based on the input. The method also includes generating, by the NRDU handover simulator, a traffic profile based on the input for performing the at least one handover of the at least one simulated UE group and performing, by the NRDU handover simulator, simulated handover of the at least one UE group associated with the at least one simulated DU periodically, for testing the DUT.

Conventional methods and systems for handover simulation provide a user to simulate specific instances of UE or specific instances of DU or some specific type of the handover only. Therefore, only one handover scenario can be tested in one iteration. As a result, the real filed deployment scenario may not be completely emulated for testing the DUT.

Unlike to the conventional methods and systems, the proposed method allows a user to envisage and execute a set of handover simulation by clubbing a plurality of DUs into a single application and thereby simulating various handover scenarios with very low CPU utilization and memory usage footprint.

Conventional methods and systems for UE and DU simulation require multiple DUs to be simulated individually which consume a lot of CPU processing capability and memory space. As a result, the handover simulator becomes expensive.

Unlike to the conventional methods and systems, the proposed method can be extrapolated for N number of UEs across different network topology.

Unlike to the conventional methods and systems, the proposed method allows a user to simulate different types of handovers in the single text scenario. This feature ensures that near real-time handover condition is generated for testing the DUT which increases a reliability and efficiency of the DUT when deployed in real-life scenarios.

Referring now to the drawings, and more particularly to FIGS. 1 through 6, where similar reference characters denote corresponding features consistently throughout the figures, there are shown preferred embodiments.

FIG. 1 illustrates a block diagram of a NRDU handover simulator (100) for performing new radio (NR) standalone (SA) handover simulation, according to an embodiment as disclosed herein.

The NRDU handover simulator (100) includes a memory (120), a processor (140), a communicator (160) and a handover management controller (180). The handover management controller (180) includes a test controller (182), a UE group simulator (184), a DU simulator (186) and a traffic generator (188). The handover management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The FIG. 1 indicates the handover management controller (180) out of the processor (140). However, the handover management controller (180) can be incorporated within the processor (140) or as part of any other processor/processors or can in itself be a processor.

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the test controller (182). The processor (140) is configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the NRDU handover simulator (100) and with external devices via one or more networks.

In an embodiment, the test controller (182) is configured to receive an input for performing a handover for testing a device under test (DUT). The test controller (182) is configured to generate a handover scenario file which includes a handover management table based on the input; determine the handover parameters for the handover from the handover management table and determine the simulated UE group of the plurality of simulated UE groups with a corresponding cell index for performing the handover based on the input. The handover management table includes handover parameters for each simulated UE group with corresponding cell index. The handover parameters can be for example but not limited to handover type, channel quality, channel parameters, etc. The test controller (182) is for example a Test automation controller (TAC).

The test controller (182) is configured to cause the traffic generator (188) to generate a traffic profile based on the input for performing the at least one handover of the at least one simulated UE group and perform simulated handover of the at least one UE group associated with the at least one simulated DU periodically, for testing the DUT. Further, the test controller (182) is configured to test the DUT based on the simulated handover of the at least one UE group associated with at least one simulated DU.

Furthermore, the test controller (182) is also configured to perform a capacity handover testing for the DUT using the plurality of UE groups associated with the at least one simulated DU of the plurality of simulated DUs.

The input includes for example, at least one of: a number of UEs to be simulated within each simulated UE group, a designation of travel path for each simulated UE group, a speed of travel for each simulated UE group on each path, a traffic profile each simulated UE group, a number of DUs to be simulated, number of cells, number of sectors within each of the cells, routes for connecting each of the cells and channel conditions to be simulated for the handover scenarios.

The plurality of handover scenarios includes intra DU handover scenario, inter DU handover scenario, inter gNodeB (gNB) handover scenario, intra gNB handover scenario, inter frequency handover scenario and intra frequency handover scenario, within the single test scenario.

In an embodiment, the UE group simulator (184) is configured to simulate the plurality of UE groups. Here, each of the simulated UE group is associated with at least one simulated DU. The number of UEs to be simulated within each of the UE group is determined based on the input. Therefore, the number of UEs to be simulated within each of the UE group and the number of simulated UE groups is customized based on user preference.

In an embodiment, the DU simulator (186) is configured to simulate the plurality of DUs. The number of DUs to be simulated is determined based on the input and hence the number of simulated DUs is customized based on the user preference. Here, the plurality of DUs are deployed as for example control path simulators (CP SIMs). Each CP SIM is deployed as a single DU. The number of simulated DUs can be increased with addition of every CP SIM. Further, multiple CP SIMs can be clubbed together and deployed as a single application which reduces the memory usage and processing capacity of the NRDU handover simulator (100).

In an embodiment, the traffic generator (188) is configured to generate the traffic profile based on the input for performing the handover of the simulated UE group. The traffic profile includes for example but not limited to at least one of: a speed at which a simulated UE group travels through the network, a traffic pattern mixture of data and voice calls, a type of the handover scenario and a frequency of applying the handover scenario to the simulated UE group. The traffic generator (188) may be located out of the NRDU handover simulator (100) in some cases.

Further, in the deployment mode the proposed method allows the user to simulate any number of handovers, various types of handovers and the simulated UEs can be distributed across multiple cells. For example, if 100 UEs are simulated then 50 UEs can be configured to perform intra DU handover, 20 UEs can be configured to perform inter DU handover, 10 UEs can be configured to perform intra frequency gNB handover and another 10 UEs can be configured to perform inter frequency gNB handover, all simultaneously. Also, the various handover scenarios can be performed iteratively in a single deployment. This is the exact replica of the real-life handover scenario when the UEs are mobile.

At least one of the plurality of modules/components of the test controller (182) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the DUT (190) is the device which is tested under various handover scenarios. The DUT (190) can be for example but not limited to a next generation central unit (NGCU), gNodeB, 5G core, etc.

Although the FIG. 1 shows various hardware components of the NRDU handover simulator (100) but it is to be understood that other embodiments are not limited thereon. In other embodiments, the NRDU handover simulator (100) may include less or more number of components. Further, the labels or names of the components are used only for illustrative purpose and does not limit the scope of the invention. One or more components can be combined together to perform same or substantially similar function to manage the contact pressure in the NRDU handover simulator (100).

Figure 2:
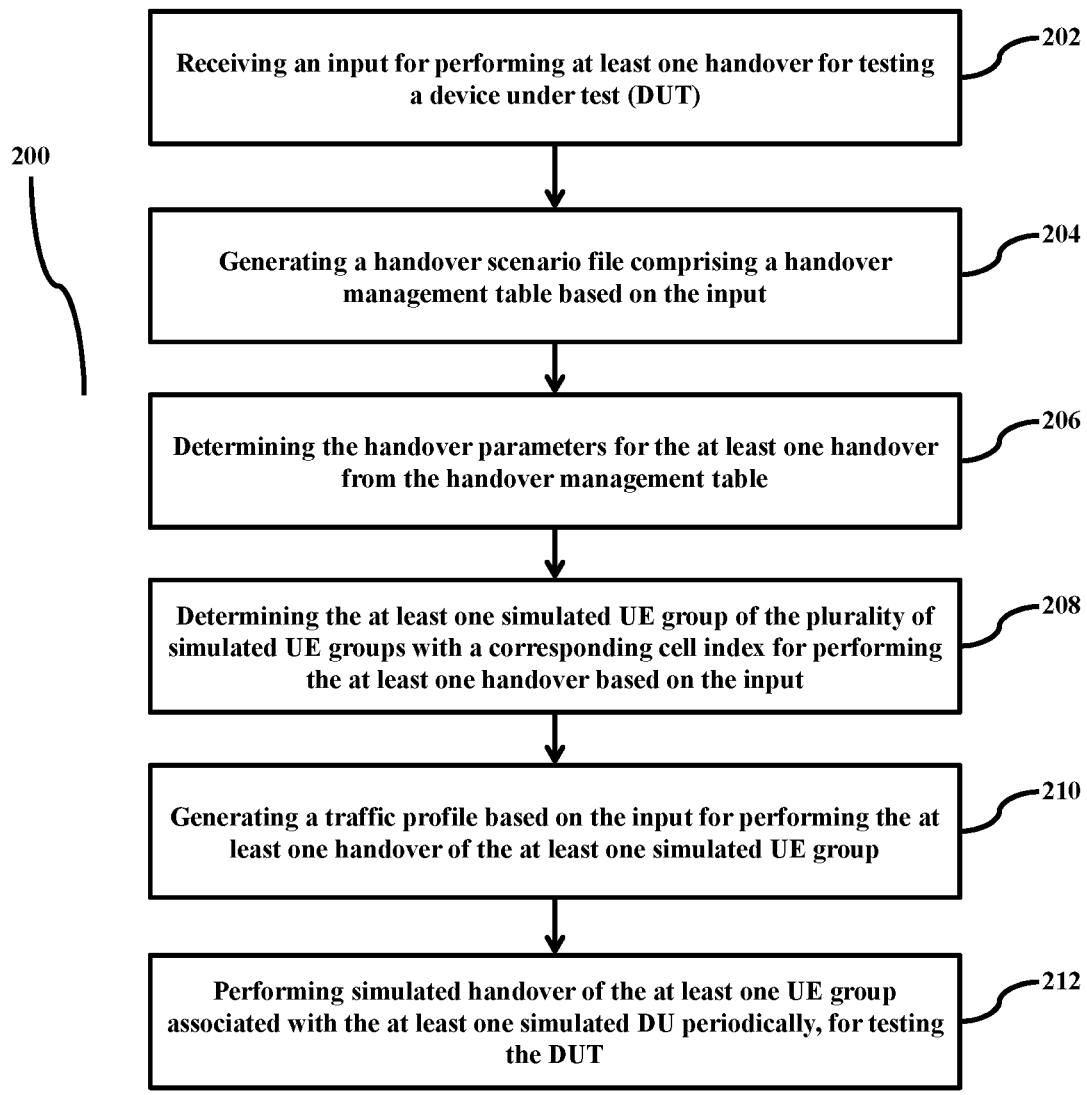
FIG. 2 is a flow diagram illustrating a method for performing the NR SA handover simulation using the NRDU handover simulator, according to an embodiment as disclosed herein.

FIG. 2 is a flow diagram (200) illustrating a method for performing the NR SA handover simulation using the NRDU handover simulator (100), according to an embodiment as disclosed herein.

Referring to the FIG. 2, at step 202 the method includes the NRDU handover simulator (100) receiving the input for performing at least one handover for testing the DUT (190). For example, in the NRDU handover simulator (100) described in the FIG. 1, the test controller (182) is configured is configured to receive the input for performing at least one handover for testing the DUT (190).

At step 204 the method includes the NRDU handover simulator (100) generating the handover scenario file comprising the handover management table based on the input. For example, in the NRDU handover simulator (100) described in the FIG. 1, the test controller (182) is configured is configured to generate the handover scenario file comprising the handover management table based on the input.

At step 206 the method includes the NRDU handover simulator (100) determining the handover parameters for the at least one handover from the handover management table. For example, in the NRDU handover simulator (100) described in the FIG. 1, the test controller (182) is configured to determine the handover parameters for the at least one handover from the handover management table.

At step 208 the method includes the NRDU handover simulator (100) determining the at least one simulated UE group of the plurality of simulated UE groups with the corresponding cell index for performing the at least one handover based on the input. For example, in the NRDU handover simulator (100) described in the FIG. 1, the test controller (182) is configured is configured to determine the at least one simulated UE group of the plurality of simulated UE groups with the corresponding cell index for performing the at least one handover based on the input.

At step 210 the method includes the NRDU handover simulator (100) generating the traffic profile based on the input for performing the at least one handover of the at least one simulated UE group. For example, in the NRDU handover simulator (100) described in the FIG. 1, the traffic generator (188) is configured to generate the traffic profile based on the input for performing the at least one handover of the at least one simulated UE group.

At step 212 the method includes the NRDU handover simulator (100) performing the simulated handover of the at least one UE group associated with the at least one simulated DU periodically, for testing the DUT (190). For example, in the NRDU handover simulator (100) described in the FIG. 1, the test controller (182) is configured to perform the simulated handover of the at least one UE group associated with the at least one simulated DU periodically, for testing the DUT (190).

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 3:
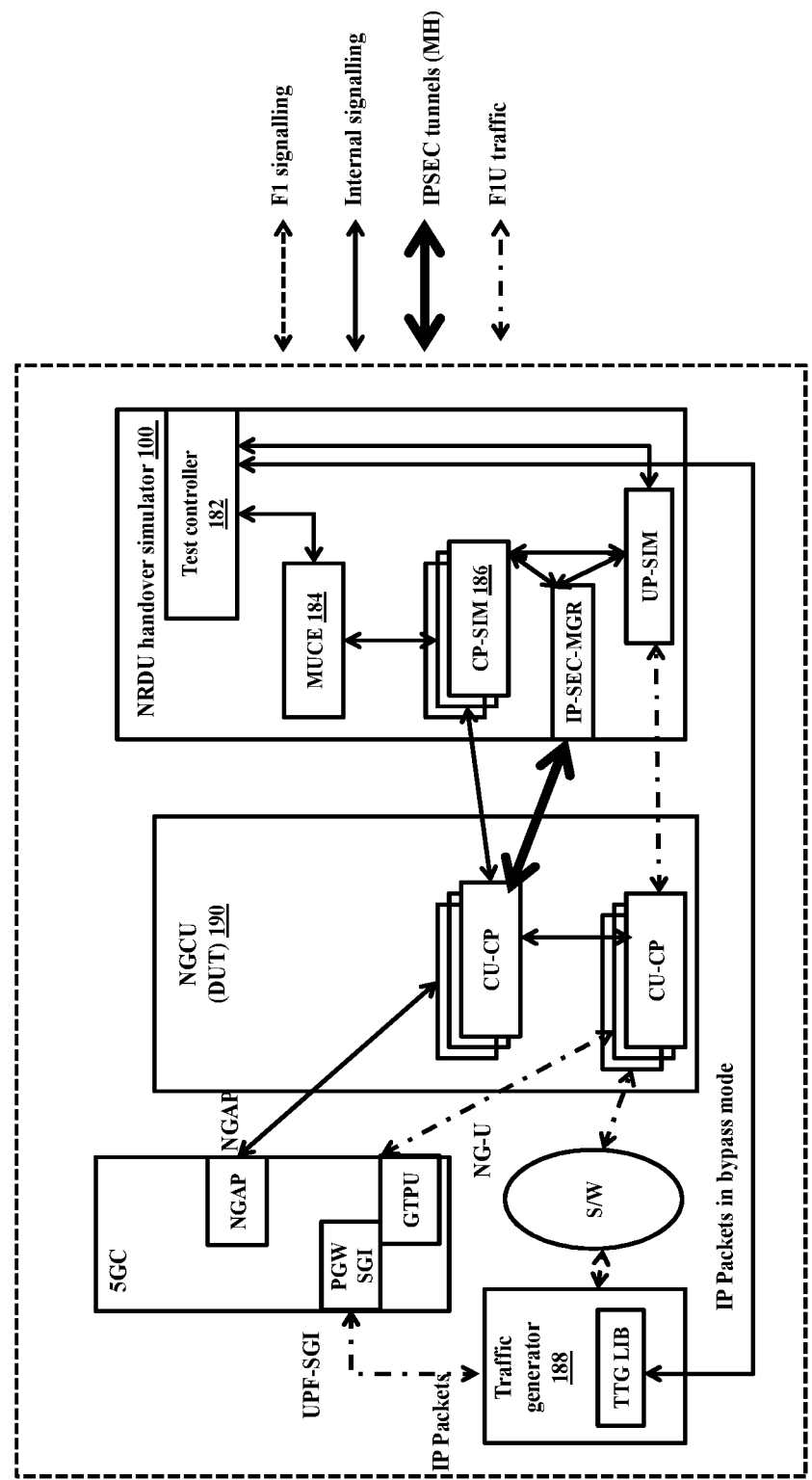
FIG. 3 is an example deployment of the NRDU handover simulator to test a NGCU, according to an embodiment as disclosed herein.

FIG. 3 is an example deployment of the NRDU handover simulator (100) to test a NGCU (190), according to an embodiment as disclosed herein.

In an example, consider that the UE is attached to a first cell and needs to do the handover to a second cell, followed by a third cell, a fourth cell and so on, as done in a real-time field scenario where the UE is mobile at a specific speed. However, there are no existing methods and systems which replicate the above mentioned real-time field scenario for handover of the UE. Unlike to the conventional methods and systems, the proposed method creates the real-time field scenario for the handover simulation based on configuration. Therefore, the UE attached to the first cell can do a handover to the second cell and then handover to the third cell and so on.

There is no limitation with respect to the handover flavour. The UE can perform Intra/Inter DU, Inter GNB handover for both Inter/Intra frequency within the same test scenario execution. Further, the NRDU handover simulator (100) can be used as both functional testing and also as a performance tool.

Referring to the FIG. 3, the deployment layout for the handover use cases is provided where the NGCU (190) is the device under test and NRDU-SIM is the emulator of handover scenarios. The combination of the handover scenarios is achieved as follows—

At step 1, the test controller (182) which is the TAC receives the input form the user and generates the multiple UE groups and the multiple DUs by clubbing the multiple CP-SIMs (186a-N). At step 2, the table of HO combination indexed on source PCI is created at the test controller (182). Further, at step 3, the test controller (182) will periodically apply the handover scenario to the specific UE groups. At step 4, the UEs based on source PCI will perform the corresponding HO combination as defined in step (2). At step 5, the MUCE (UE simulator) which is connected to multiple DU (simulated) that allow the framework to emulate the handover combination across DUs/frequencies/NG-CUs.

The proposed method provides a unique solution for testing performance related KPIs of the NGCU using a combination of the handover scenarios. The proposed method allows the user to emulate the near to field deployment scenario wherein the UE moving from Point A to Point B can encounter N number of handovers of different types. The proposed method allows the simulation of any number of Inter/Intra DU, Inter GNB handovers in any order based on the user requirement. The proposed method provides the user the flexibility to configure a mix and match of different handover scenarios for the single test execution. The proposed method is very flexible in terms of resource utilization, i.e. it has very low CPU requirement and memory footprint.

Further, in a variation of the proposed method it can simulate small-cell and macro DUs (SUB-6 & MM-WAVE). The proposed method can also be scaled to support ENDC handover (MN handover with SN change) or SN handover. The proposed method can trigger different handover scenarios for UEs attached to different cells. The proposed method can be used for capacity handover testing for max number of UEs attached to a particular cell.

Figure 4:
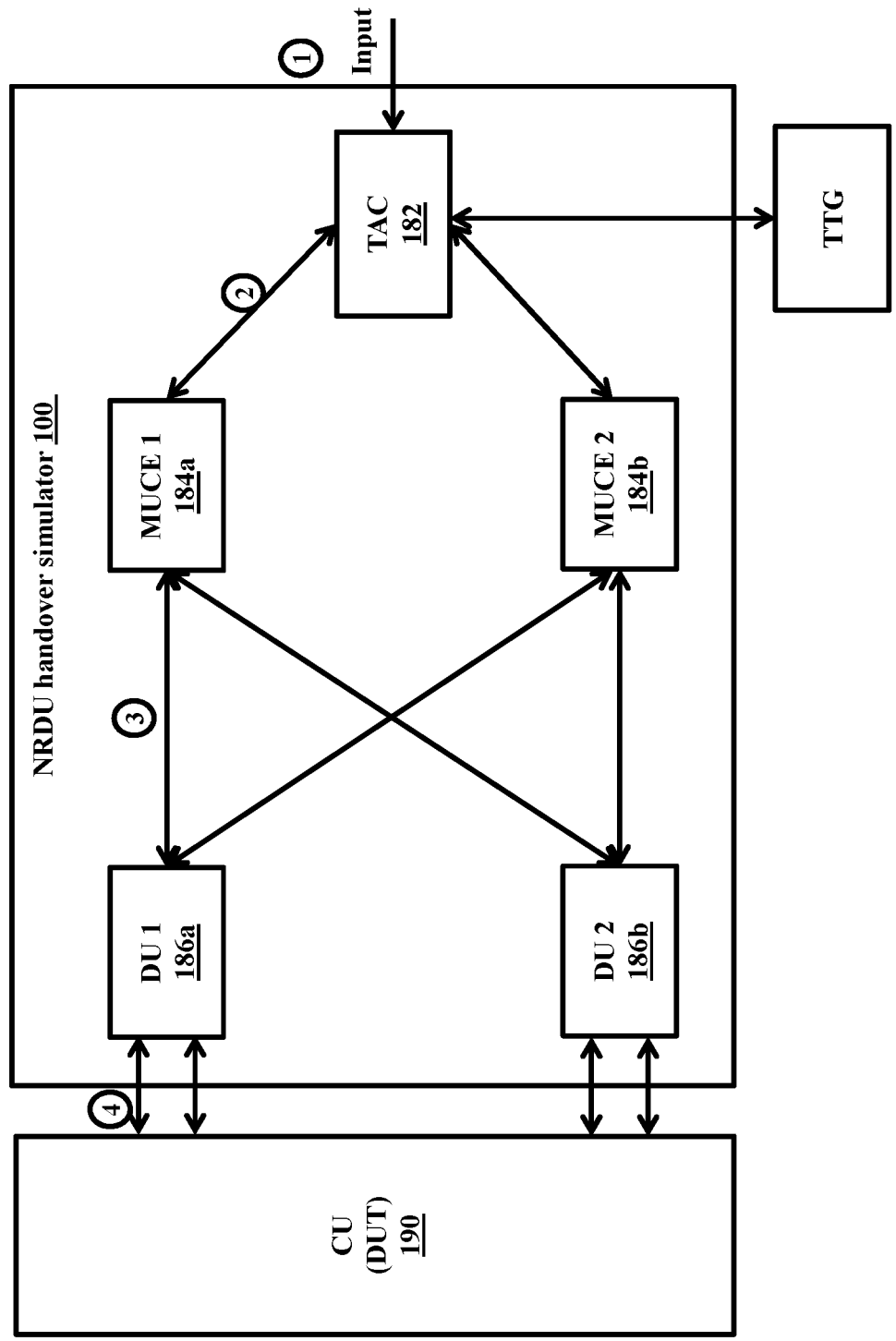
FIG. 4 is an example illustrating a scenario of inter DU SA handover using the NRDU handover simulator, according to an embodiment as disclosed herein.

FIG. 4 is an example illustrating a scenario of the inter DU SA handover using the NRDU handover simulator (100), according to an embodiment as disclosed herein.

Referring to the FIG. 4, consider that there are two DUs generated and deployed by the NRDU handover simulator (100) which includes DU1 (186a) and DU2 (186b). Consider that each DU servers about 6 cells each i.e., cells with cell index 1 to cell index 6 are served by the DU1 (186a) and cells with cell index 7 to cell index 12 are served by the DU2 (186b).

At step 1, the TAC (182) receives the input from the user to simulate an inter DU handover. The input may include the handover parameters such as the traffic to be generated, the quality of the channel, the number of UE groups each MUCE should have, the UE groups which will perform the handover, etc. Here MUCE is a container of UEs which may for example contain 1024 UEs which are segregated into different groups. At step 2, the TAC (182) sends the instruction to the MUCE 1 (184a) indicating that a UE group 1 which is associated with the MUCE 1 (184a), needs to perform the handover from the cell with cell index 1 to cell with cell index 10. Here each MUCE can support a maximum of 1024 UEs which may be grouped into specific numbers.

At step 3, the MUCE 1 (184a) interacts with the DU1 (186a) and enables the inter DU handover of the UE group 1 from the cell index 1 to the cell index 10. At step 4, the CU (190) is tested under the handover scenario for its functioning under the scenario of a mass handover. It may be noted that the example indicated only two DUs and movement of a single UE group. However, this is used only for the purpose of explanation and is not a limitation on the invention.

Figure 5:
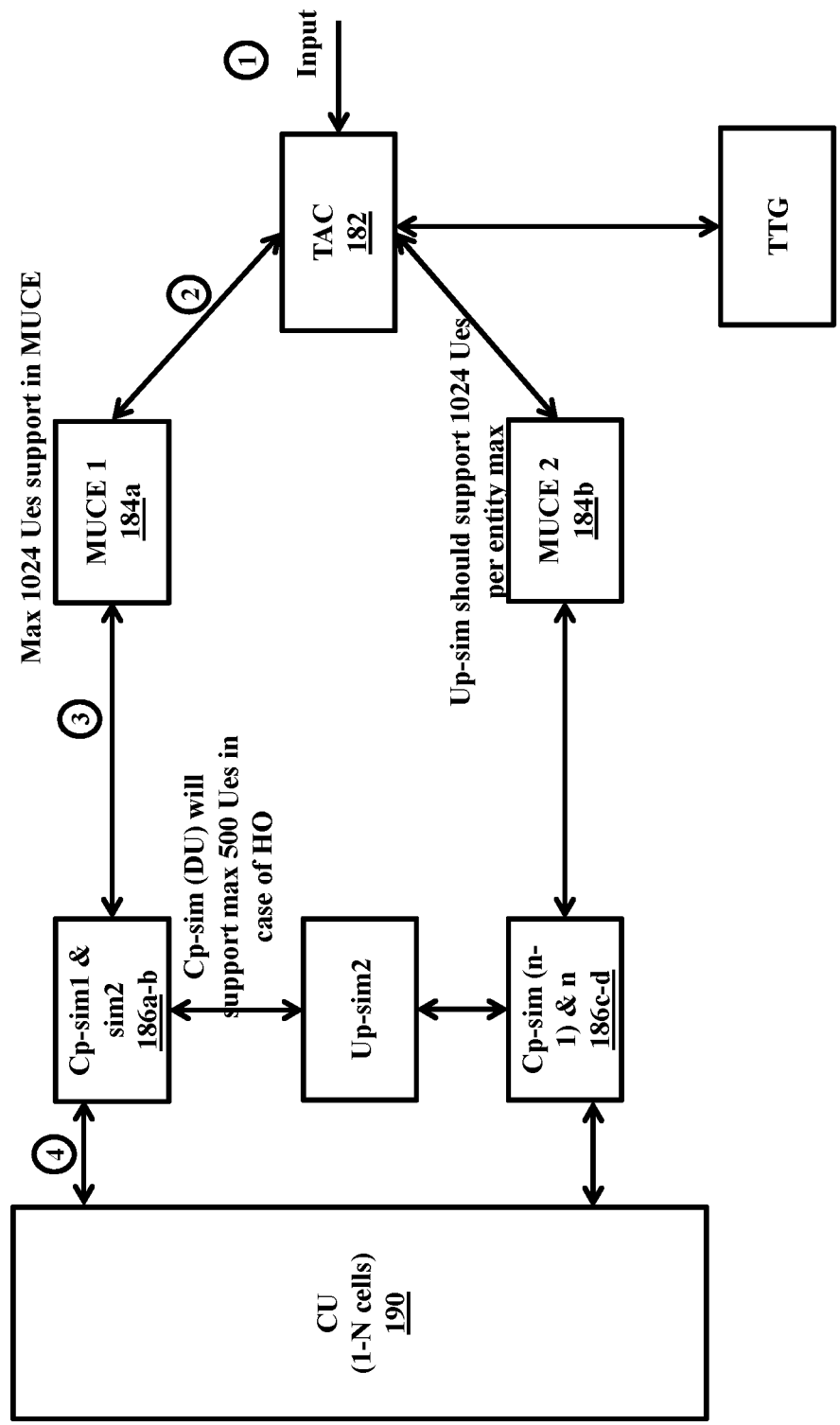
FIG. 5 is an example illustrating a scenario of inter DU handover and intra DU handover using the NRDU handover simulator, according to an embodiment as disclosed herein.

FIG. 5 is an example illustrating a scenario of the inter DU handover and the intra DU handover using the NRDU handover simulator (100), according to an embodiment as disclosed herein.

Referring to the FIG. 5, consider that there are multiple DUs generated and deployed by the NRDU handover simulator (100) which includes CP-SIM1 and CP-SIM2 (186a-b) clubbed together and deployed as the single application and CP-SIM (n-1) and CP-SIM n (186c-d) clubbed together and deployed as the single application. Consider that each DU servers about 6 cells each i.e., cells with cell index 1 to cell index 6 are served by the CP-SIM1 (186a) and cells with cell index 7 to cell index 12 are served by the CP-SIM2 (186b), etc. UP-SIM should support 1024 UEs per entity maximum. CP-SIM (DU) will support maximum 500 UEs in case of the handover.

At step 1, the TAC (182) receives the input from the user to simulate the inter DU handover. The input may include the handover parameters such as the traffic to be generated, the quality of the channel, the number of UE groups each MUCE should have, the UE groups which will perform the handover, etc. At step 2, the TAC (182) sends the instruction to the MUCE 1 (184a) indicating that the UE group 1 which is associated with the MUCE 1 (184a), needs to perform the handover from the cell with cell index 1 associated with the CP-SIM1 (186a) to cell with cell index 7 associated with the CP-SIM2 (186b). At step 3, the MUCE 1 (184a) interacts with the CP-SIM1 (186a) and enables the inter DU handover of the UE group 1 from the cell index 1 to the cell index 7. At step 4, the CU (190) is tested under the handover scenario.

At step 2, the TAC (182) also sends the instruction to the MUCE 1 (184a) indicating that the UE group 2 which is associated with the MUCE 1 (184a), needs to perform the intra DU handover from the cell with cell index 2 associated with the CP-SIM1 (186a) to cell with cell index 4 also associated with the CP-SIM1 (186a). At step 3, the MUCE 1 (184a) interacts with the CP-SIM1 (186a) and enables the intra DU handover of the UE group 2 from the cell index 2 to the cell index 4. At step 4, the CU (190) is tested under the intra DU handover scenario.

Figure 6:
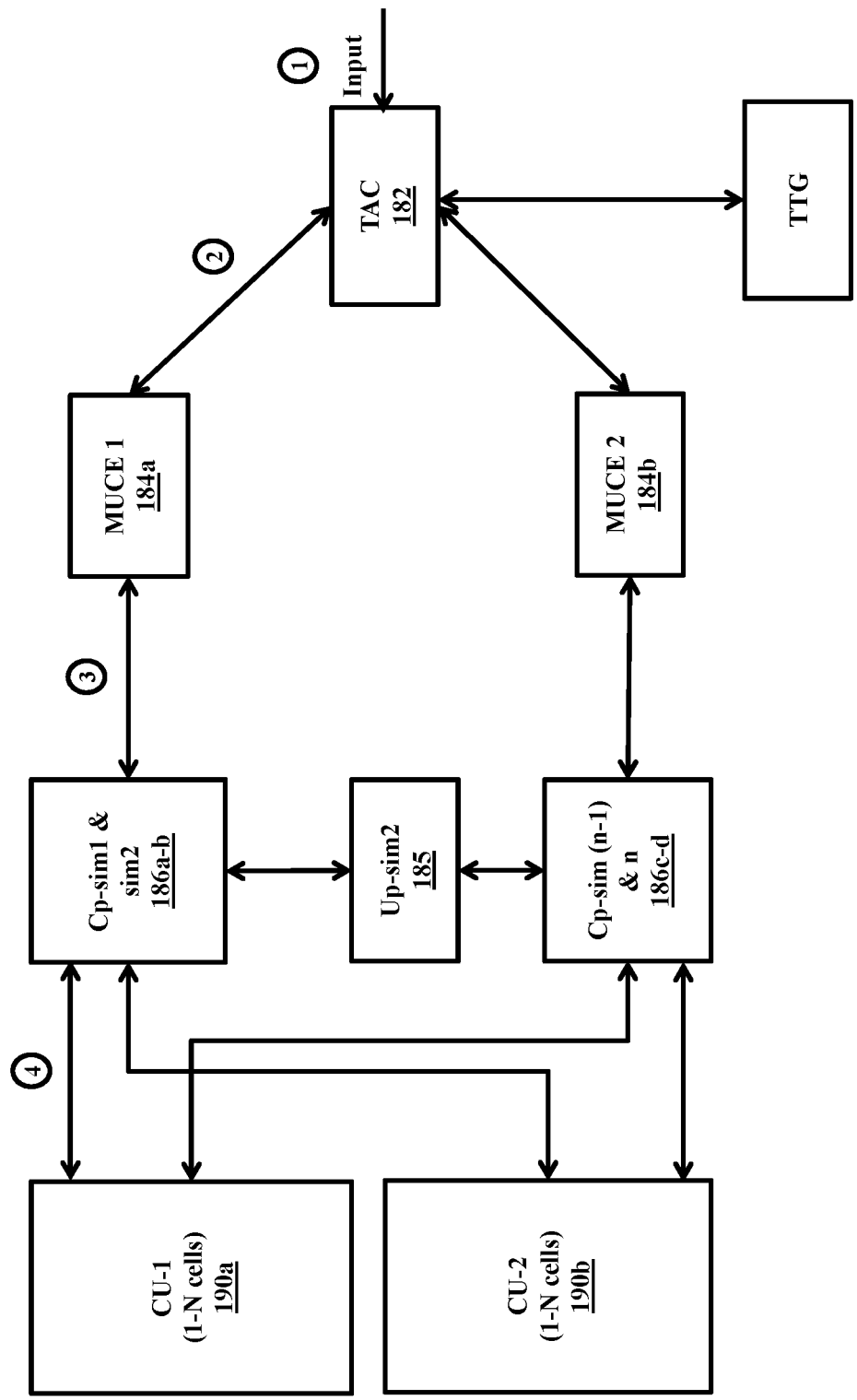
FIG. 6 is an example illustrating a scenario of inter gNB handover using the NRDU handover simulator, according to an embodiment as disclosed herein.

FIG. 6 is an example illustrating a scenario of the inter gNB handover using the NRDU handover simulator (100), according to an embodiment as disclosed herein.

Referring to the FIG. 6, consider that there are multiple DUs generated and deployed by the NRDU handover simulator (100) which includes CP-SIM1 and CP-SIM2 (186a-b) clubbed together and deployed as the single application and CP-SIM (n-1) and CP-SIM n (186c-d) clubbed together and deployed as the single application. Consider that each DU servers about 6 cells each i.e., cells with cell index 1 to cell index 6 are served by the CP-SIM1 (186a) and cells with cell index 7 to cell index 12 are served by the CP-SIM2 (186b), etc. Consider that the CP-SIM1 (186a) is interacting with CU 1 (190a) and the CP-SIM2 (186b) is interacting with CU 2 (190b).

At step 1, the TAC (182) receives the input from the user to simulate the inter gNB handover. At step 2, the TAC (182) sends the instruction to the MUCE 1 (184a) indicating that the UE group 3 which is associated with the MUCE 1 (184a), needs to perform the handover from the cell with cell index 1 associated with the CP-SIM1 (186a) to cell with cell index 7 associated with the CP-SIM2 (186b). At step 3, the MUCE 1 (184a) interacts with the CP-SIM1 (186a) and enables the inter gNB handover of the UE group 1 from the cell index 1 to the cell index 7. At step 4, the CU (190) is tested under the inter gNB handover scenario.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A new radio distributed unit (NRDU) handover simulator for performing new radio (NR) standalone (SA) handover simulation, wherein the NRDU handover simulator comprises:
   a memory;
   a processor coupled to the memory;
   a communicator coupled to the memory and the processor;
   wherein the processor comprises:
      a user equipment (UE) group simulator configured to generate a plurality of simulated UE groups;
      a DU simulator configured to generate a plurality of simulated DUs, wherein the plurality of simulated DUs is clubbed to provide a single deployment; and
      a test controller connected to the plurality of simulated UE groups and a traffic generator, and
   wherein each simulated UE group of the plurality of simulated UE groups is connected to at least one simulated DU of the plurality of simulated DUs, and the processor is configured to:
      receive an input for performing at least one handover for testing a device under test (DUT),
      determine at least one simulated UE group of the plurality of simulated UE groups connected to the at least one simulated DU of the plurality of simulated DUs for performing the at least one handover based on the input;
      cause the traffic generator to generate a traffic profile based on the input for performing the at least one handover of the at least one simulated UE group; and
      perform simulated handover of the at least one UE group associated with the at least one simulated DU periodically, for testing the DUT.

2. The NRDU handover simulator as claimed in claim 1, wherein the processor is configured to determine the at least one simulated UE group of the plurality of simulated UE groups associated with the at least one simulated DU of the plurality of simulated DUs for performing the at least one handover based on the input comprises:
   generate a handover scenario file comprising a handover management table based on the input, wherein the handover management table comprises handover parameters for each simulated UE group with corresponding cell index;
   determine the handover parameters for the at least one handover from the handover management table; and
   determine the at least one simulated UE group of the plurality of simulated UE groups with a corresponding cell index for performing the at least one handover based on the input.

3. The NRDU handover simulator as claimed in claim 1, wherein the processor is configured to:
   test the DUT based on the simulated handover of the at least one UE group associated with at least one simulated DU.

4. The NRDU handover simulator as claimed in claim 1, wherein the processor is configured to:
   perform a capacity handover testing for the DUT using the plurality of UE groups associated with the at least one simulated DU of the plurality of simulated DUs.

5. The NRDU handover simulator as claimed in claim 1, wherein the plurality of handover scenarios comprises intra DU handover scenario, inter DU handover scenario, inter gNodeB (gNB) handover scenario, intra gNB handover scenario, inter frequency handover scenario and intra frequency handover scenario, within the single test scenario.

6. The NRDU handover simulator as claimed in claim 1, wherein the traffic profile comprises at least one of a speed at which a simulated UE group travels through the network, a traffic pattern mixture of data and voice calls, a type of the handover scenario and a frequency of applying the handover scenario to the simulated UE group.

7. The NRDU handover simulator as claimed in claim 1, wherein the input comprises at least one of: a number of UEs to be simulated within each simulated UE group, a designation of travel path for each simulated UE group, a speed of travel for each simulated UE group on each path, a traffic profile each simulated UE group, a number of DUs to be simulated, number of cells, number of sectors within each of the cells, routes for connecting each of the cells and channel conditions to be simulated for the handover scenarios.

8. A method for performing new radio (NR) standalone (SA) handover simulation using a NRDU handover simulator, wherein the method comprises:
   receiving, by the NRDU handover simulator, an input for performing at least one handover for testing a device under test (DUT);
   determining, by the NRDU handover simulator, at least one simulated UE group of a plurality of simulated UE groups associated with at least one simulated DU of a plurality of simulated DUs for performing the at least one handover based on the input;
   generating, by the NRDU handover simulator, a traffic profile based on the input for performing the at least one handover of the at least one simulated UE group; and
   performing, by the NRDU handover simulator, simulated handover of the at least one UE group associated with the at least one simulated DU periodically, for testing the DUT,
   wherein each simulated UE group of the plurality of simulated UE groups is connected to the at least one simulated DU of the plurality of simulated DUs.

9. The method as claimed in claim 8, wherein determining, by the NRDU handover simulator, the at least one simulated UE group of the plurality of simulated UE groups associated with the at least one simulated DU of the plurality of simulated DUs for performing the at least one handover based on the input comprises:
   generating, by the NRDU handover simulator, a handover scenario file comprising a handover management table based on the input, wherein the handover management table comprises handover parameters for each simulated UE group with corresponding cell index;
   determining, by the NRDU handover simulator, the handover parameters for the at least one handover from the handover management table; and
   determining, by the NRDU handover simulator, the at least one simulated UE group of the plurality of simulated UE groups with a corresponding cell index for performing the at least one handover based on the input.

10. The method as claimed in claim 8, further comprises:
    testing, by the NRDU handover simulator, the DUT based on the simulated handover of the at least one UE group associated with at least one simulated DU.

11. The method as claimed in claim 8, further comprises:
    performing, by the NRDU handover simulator, a capacity handover testing for the plurality of UE groups associated with the at least one simulated DU of the plurality of simulated DUs.

12. The method as claimed in claim 8, wherein the input comprises at least one of: a number of UEs to be simulated within each simulated UE group, a designation of travel path for each simulated UE group, a speed of travel for each simulated UE group on each path, a traffic profile for each simulated UE group, a number of DUs to be simulated, a number of cells to be generated with each simulated DU, a number of sectors within each of the cell, routes for connecting each of the cells and channel conditions to be simulated for the handover.

13. The method as claimed in claim 8, wherein the plurality of handover scenarios comprises intra DU handover scenario, inter DU handover scenario, inter gNB handover scenario, intra gNB handover scenario, inter frequency handover scenario and intra frequency handover scenario, within the single test scenario.

14. The method as claimed in claim 8, wherein the traffic profile comprises at least one of a speed at which a simulated UE group travels through the wireless communication network, a traffic pattern mixture of data and voice calls, a type of the handover and a frequency of performing a periodic simulated handover of the at least one simulated UE group.

* * * * *